No. 876,216. PATENTED JAN. 7, 1908.
J. MOSCROP.
YARN TESTING MACHINE.
APPLICATION FILED JAN. 4, 1907.

4 SHEETS—SHEET 1.

WITNESSES
Alvin J. White
W. P. Burks

INVENTOR
John Moscrop
BY
Richards & Co.
ATTYS

No. 876,216. PATENTED JAN. 7, 1908.
J. MOSCROP.
YARN TESTING MACHINE.
APPLICATION FILED JAN. 4, 1907.

4 SHEETS—SHEET 2.

WITNESSES
W. P. Burks
Geo. J. Sweeney

INVENTOR
John Moscrop
By Richards & Co.
ATTYS.

THE NORRIS PETERS CO., WASHINGTON, D. C.

No. 876,216.
PATENTED JAN. 7, 1908.
J. MOSCROP.
YARN TESTING MACHINE.
APPLICATION FILED JAN. 4, 1907.
4 SHEETS—SHEET 3.
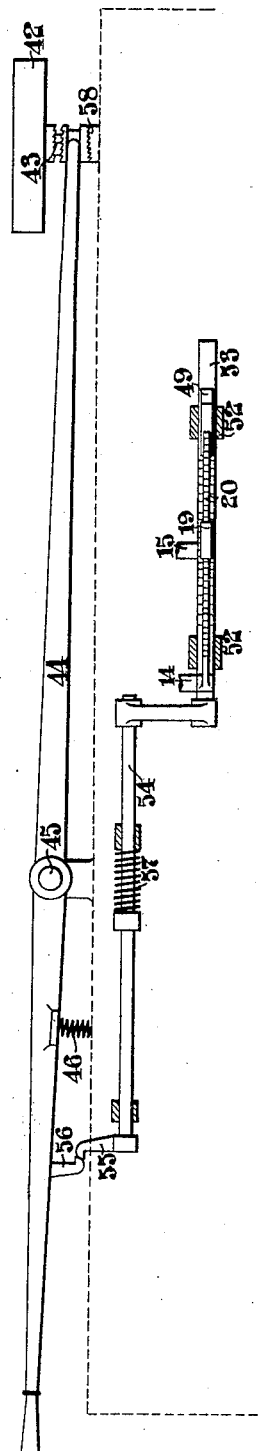
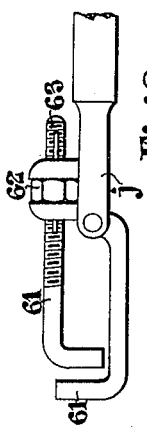
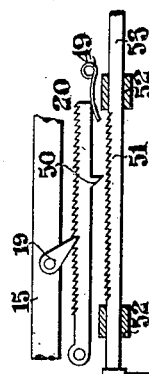
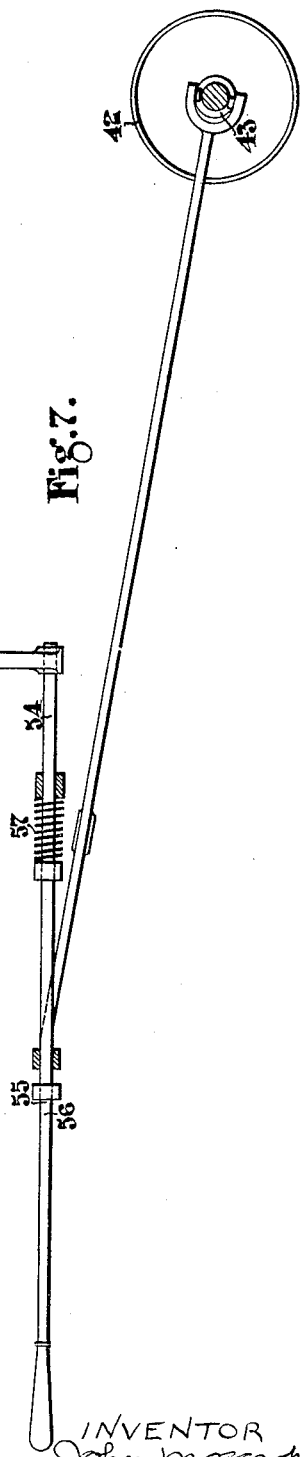
WITNESSES
Alvin J. White
W. P. Bush
INVENTOR
John Moscrop
BY Richards & Co.
ATT'YS No. 876,216. PATENTED JAN. 7, 1908.
J. MOSCROP.
YARN TESTING MACHINE.
APPLICATION FILED JAN. 4, 1907.

4 SHEETS—SHEET 4.

WITNESSES
Alvin J. White
W. P. Buck

INVENTOR
John Moscrop
BY
Richards & Co.

ATTYS

THE NORRIS PETERS CO., WASHINGTON, D. C.

UNITED STATES PATENT OFFICE.

JOHN MOSCROP, OF MANCHESTER, ENGLAND.

YARN-TESTING MACHINE.

No. 876,216.　　　　Specification of Letters Patent.　　　　Patented Jan. 7, 1908.

Application filed January 4, 1907. Serial No. 350,814.

*To all whom it may concern:*

Be it known that I, JOHN MOSCROP, a subject of the King of Great Britain and Ireland, residing a 106 Princess street, Manchester, in the county of Lancaster, England, have invented certain new and useful Improvements in Yarn-Testing Machines, of which the following is a specification.

This invention relates to a machine for testing yarn and my object is to combine a wrap reel with a lea tester so as to enable a lea or number of strands of yarn to be wound and tested as to strength in a convenient manner and without being fingered.

Figure 1:
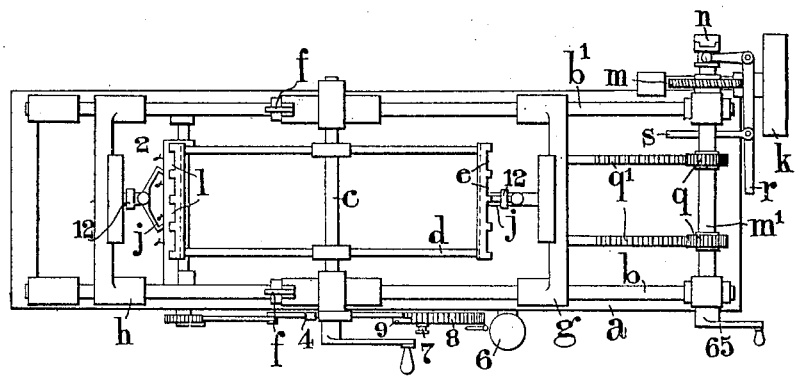
Figure 3:
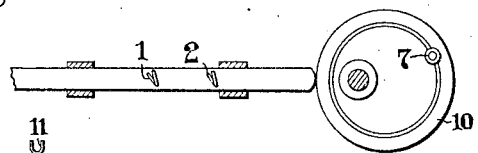
Figure 2:
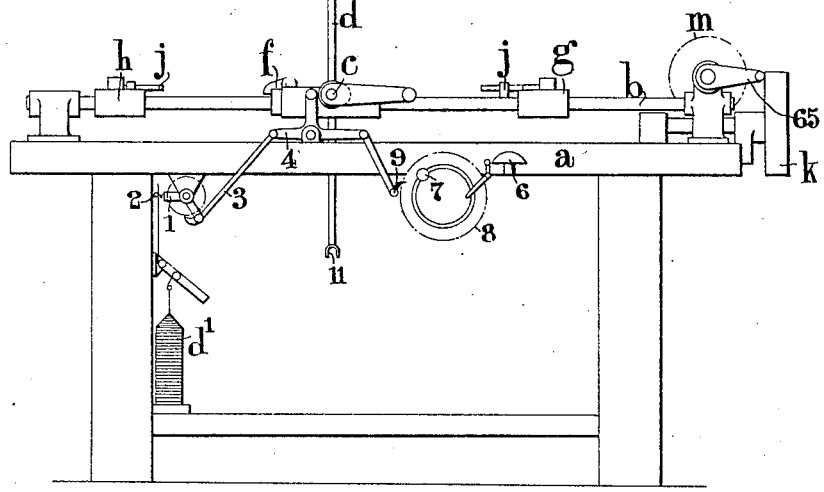
Figure 4:
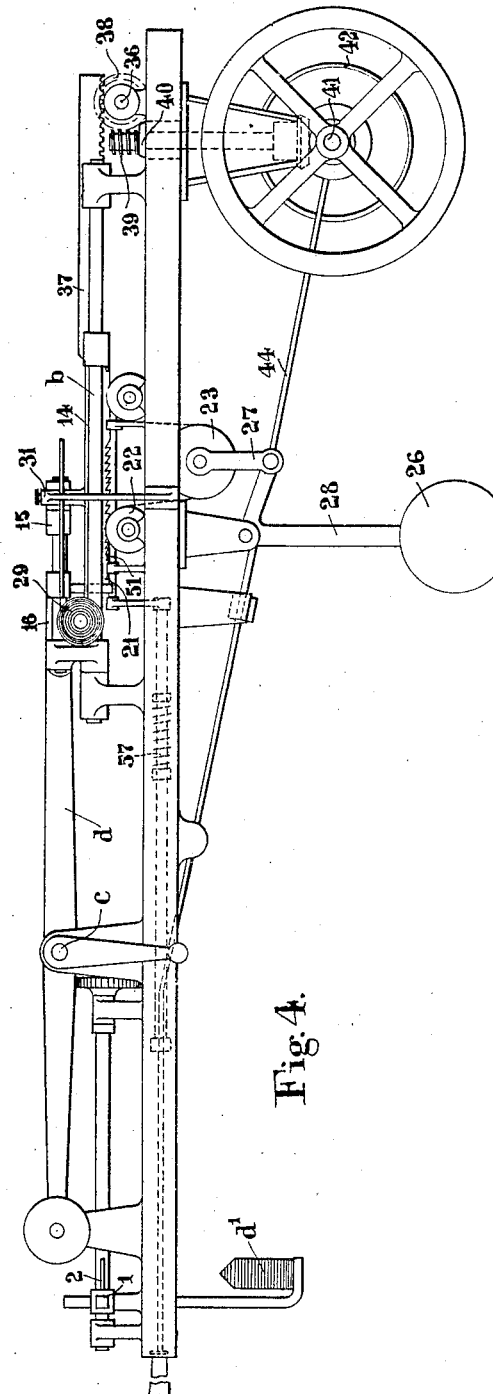
Figure 5:
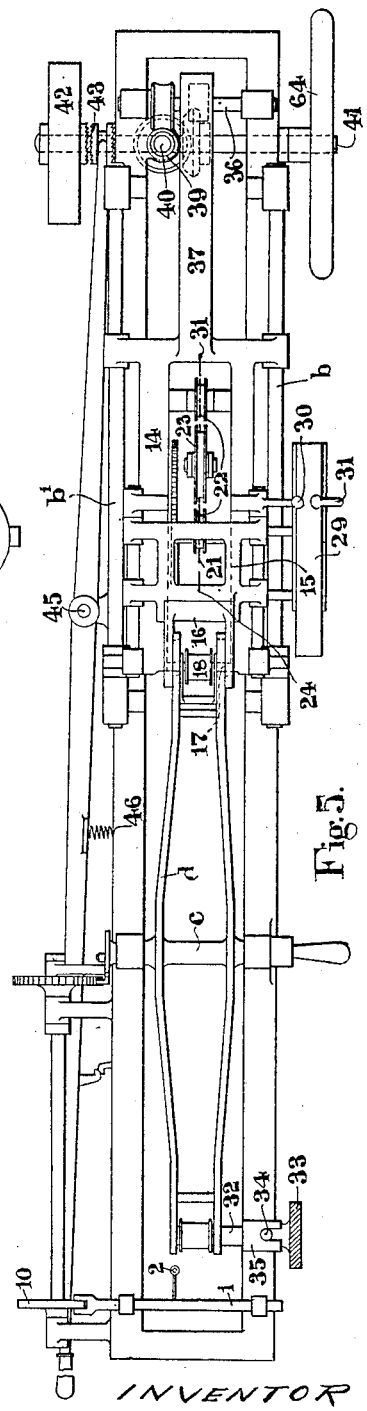
Figure 9:
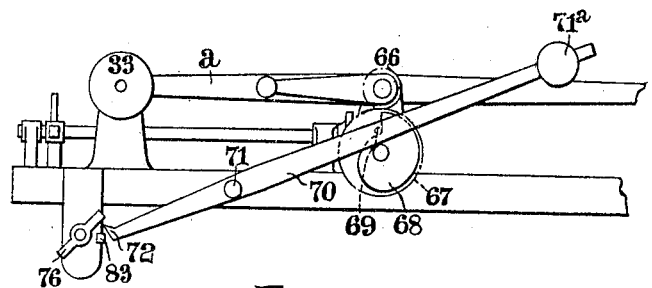
Figure 10:
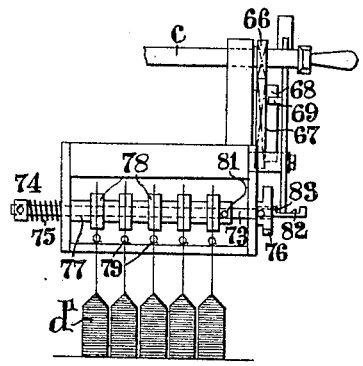

Referring to the accompanying drawings;—Figure 1 shows in plan one form of testing machine constructed according to my invention. Fig. 2 is an elevation of the same machine but with the wrap reel in a different position. Fig. 3 shows a modified form of one of the parts of the machine shown in Figs. 1 and 2. Fig. 4 is an elevation of another form of machine constructed in accordance with my invention. Fig. 5 is a plan of the machine shown in Fig. 4. Figs. 6 and 7 are respectively plan and elevation of the automatic stop device employed with the machine shown in Figs. 4 and 5. Fig. 8 shows a modified form of gripper. Figs. 9, 10, 11 and 12 illustrate the means employed for stopping the supply of yarn to the wrap reel when a sufficient number of strands have been wound thereon.

Referring to Figs. 1 and 2, the frame $a$ supports a pair of guide bars $b$, $b'$ carrying bearings for a shaft $c$. Upon this shaft $c$ is mounted a flat wrap reel $d$ of sufficient width to accommodate several leas or sets of strands of yarn; the reel may if desired be provided at its ends with suitable grooves or spaces $e$, in each of which can be wound a lea or set of strands of yarn. The shaft $c$ supporting the reel $d$ is held in a fixed position on the bars $b$, $b'$ by means of the catches $f$ during the process of winding, but is freed by raising the said catches after the winding is completed. The reel can then be moved along the bars within certain limits for the testing operation as hereinafter described. Mounted upon the same bars $b$, $b'$ as the shaft $c$ are a pair of slides $g$, $h$ which are also capable of moving in a horizontal direction along the said bars $b$, $b'$ similarly to the shaft $c$ carrying the reel $d$. Each of the slides $g$, $h$ is provided with a gripper $j$ consisting of hingedly connected jaws as shown. Each gripper is adapted to grip the adjacent end of a lea or set of strands of yarn wound in one of the spaces in the wrap reel $d$.

For imposing tension on the yarn one of the slides as $g$ is moved relatively to the other slide $h$. One convenient form of mechanism which I employ for this purpose consists of a belt pulley $k$ mounted on a shaft which is provided with a worm gearing with a worm wheel $m$ carried loosely on a cross shaft $m'$. The worm wheel can be rigidly coupled to the cross shaft by means of a clutch $n$. A pair of pinions $q$, $q$ respectively gear with racks $q'$, $q'$ connected to the slide $g$. The elements of the mechanism are suitably proportioned so that when the clutch $n$ is put into action and the pulley $k$ is set in motion, the slide $g$ is slowly drawn along the guide bars $b$, $b'$. If the other slide $h$ is held stationary or nearly stationary and the grippers $j$ are closed upon the yarn, there is imposed upon the latter a tension which increases with the movement of the slide $g$. A handle $r$ is provided for actuating the clutch, and also a stop $s$ which is so arranged that when the slide $g$ moves into contact with the same the clutch $n$ is put out of action and further movement of the slide thereupon ceases.

For guiding the yarn from a cop or reel as $d'$ I mount a transverse bar 1 in any convenient manner beneath the frame $a$ of the machine and provide such bar with eyes or pigtails 2 for guiding the yarn to be tested on to the reel $d$. Means for giving an axial movement to the transverse bar 1 are also employed so that the several strands of yarn forming one lea or testing set will lie parallel to and not quite touching each other on the reel. The lateral motion may be given to the transverse bar by means of a screw, a small angular movement being intermittently imparted to the screw by means of a ratchet device actuated from the lever 3 connected to a rocking bar 4 which is oscillated once during each revolution of the wrap reel $d$. By varying the point of connection of the lever 3 with the rocking bar 4, I can vary the amount of movement given to the pawl and adjust the movement of the cross bar 1 and pigtails 2 to suit the thickness of the yarn being treated. I may also provide means for giving a transverse motion to the bar 1 directly by hand when desired.

A warning bell 6 is preferably arranged to ring when the required number of strands have been wound on to the reel $d$ to give one lea or testing set. This warning bell may be actuated by a pin or projection 7 formed on a slowly revolving disk or ratchet wheel 8 which can be rotated by a pawl 9 actuated from the rocking bar 4. The angular movement given to the ratchet wheel 8 at each oscillation of the pawl 9 may be regulated, in a manner similar to that described with reference to the bar 1, so that the strands of yarn in a set can be varied in number as desired. Instead of employing a ratchet device to give motion to the eyes or pigtails 2 and to actuate the bell 6, I may employ a cam 10 (see Figs. 3 and 5) which is connected in any convenient manner to the reel $d$ and slowly rotated thereby during the process of winding. During its rotation the cam gives motion to the transverse bar 1 carrying the eyes or pigtails 2 and, after the required number of revolutions has been given to the reel actuates the warning bell 6. I then prefer to employ a separate cam for each number of revolutions required to wind a testing set on to the reel. Instead of making the cam act directly on the transverse bar 1, I may interpose a lever and, by adjusting this lever can adjust the motion given to the eyes or pigtails. The advantage of the cam is that it permits of the bar 1 being more readily returned to its initial position than the ratchet device.

In order that the grippers may securely seize the yarn, I preferably form each end of the reel at the parts where the grippers act of U section as shown at 11, the yarn being stretched across or over the grooves in the reel ends and the jaws of the grippers arranged to meet or to overlap behind the yarn, i. e. between the yarn and the bottom of the grooves. For retaining the jaws of the grippers in their closed position a sliding collar or clamping piece 12 is employed. The collar is shown in the inoperative position at the left hand of Fig. 1, and in its operative position at the right hand of the said figure. The grippers are adapted to be moved along the slides $g$, and $h$ in order that any one of the several leas which can be wound on the wrap reel may be operated upon.

In the machine illustrated by Figs. 4, 5, 6 and 7, the shaft $c$ carrying the reel $d$ is mounted stationarily on the machine. In place of the slide $g$ I employ a traveling carriage 14 which is adapted to slide along the guides $b$, $b'$ of the machine. On this carriage is mounted a slide 15. The slide 15 is fitted with a hinged gripper 16 which can be turned down about its pivot pin to engage with the pin 17 carrying the roller 18 round a portion of which the yarn is wound. The pin 17 is adapted to slide in slots in the arms of the reel $d$ so that by moving the roller 18 away from the center of the reel $d$ tension is put on the yarn. The roller 18 is retained in its inner position with respect to the slots in the reel arms by a suitably disposed spring. Attached to the slide 15 at 24 is one end of a band or chain 21, the other end of which is attached to the carriage 14 at 31. This chain passes over pulleys 22, 22, mounted on the machine frame $a$ and under a jockey pulley 23. It will readily be seen that as the carriage moves relatively to the slide, the pulley 23 will be raised together with the lever 27 and bell crank lever 28 to which the weight 26 is secured. Tension will thereby be transmitted through the slide 15 and gripper 16 to the yarn wrapped on the reel $d$. In conjunction with the slide and carriage I provide a recording sheet 29 supported on a plate attached to the slide 15. Two markers or pencils 30, 31 are arranged to pass over the surface of the sheet 29 and to describe recording lines thereon. The marker or pencil 30 is attached to the carriage 14 and the pencil to the framework of the machine. It will be seen that by this arrangement the length of the line drawn by the marker 30 will indicate the movement of the carriage relatively to the slide, which is proportional to the strength of the yarn, while the pencil 31 will record the total movement of the slide which is equal to the stretch of the yarn.

In order to steady the reel during the testing operation, I may provide a spring pressed catch as 32 which engages with the side of the reel when the latter is in the testing position. To release the catch from the reel the head 33 of the catch is pulled outwards and then turned so that the pin 34 rides on the top of the casing 35 inclosing the spring for pressing the catch against the reel. The carriage 14 is moved horizontally by means of a gear wheel mounted on the shaft 36 engaging a rack secured to the extension 37 of the carriage. This shaft 36 carries a worm wheel 38 which gears with a worm 39 mounted on the shaft 40. The latter carries a bevel wheel gearing with another bevel wheel mounted on the driving shaft 41. The loose pulley 42 is capable of being connected to the shaft 41 by means of a clutch 43 actuated by a rod 44 pivoted at 45 to the frame of the machine. A spring 46 tends to hold the clutch out of engagement with the pulley 42.

For automatically putting the driving mechanism out of gear when the lea has broken the device shown in Figs. 6 and 7 is employed. The said device comprises a pawl 19 mounted on the slide 15, which pawl engages with a rack 20 pivoted to the carriage 14 and held in a horizontal position by a blade spring 49. The rack 20 is also provided with a tooth 50 which can engage a rack 51 formed on a rod 53 adapted to slide in bearings 52. This rod 53 is connected to a rod 54 carrying at one end the catch 55 which can engage a corresponding catch 56 provided on the hand rod 44 before referred to. To start the machine the rod 44 is moved so as to put the clutch 43 into engagement with the pulley 42 and at the same time to put the catch 56 into engagement with the catch 55. When the yarn breaks the slide 15 begins to move away from the reel $d$ under the action of the weight 26. The consequent thrust of the pawl 19 engaging with the rack 20 depresses the latter and causes the tooth 50 to engage a tooth of the rack 51. Longitudinal movement is thus transmitted to the rack 51 resulting in the release of the catch 55 from the catch 56 against the action of the spring 57. The spring 46 restores the handle of the rod 44 to its original position and thereby withdraws the clutch 43 from the pulley 42. The teeth 58 of the clutch now engage teeth formed on the frame of the machine and the whole of the mechanism is therefore quickly brought to rest. I may provide means for giving a quick motion to the moving slide $g$ or carriage 14. This may consist, as shown in Figs. 1 and 2, of a handle 65 connected to the shaft $m'$ and capable of rotating same when the clutch $n$ is out of gear. If desired the mechanism whereby the slide $g$ or the carriage 14 is moved so as to put tension on the yarn may be adapted for operation by hand instead of by power as hereinbefore described. Instead of arranging both jaws of the grippers $j$ to pass behind the yarn, I can arrange, as shown in Fig. 8 for one jaw 60 to pass behind the yarn and the other jaw 61 to be in front of the yarn, the jaws overlapping with the yarn between them. The jaw 61 can then be closed against the jaw 60 by means of the nut 62, or the jaw 61 may be pressed against the jaw 60 by a screw acting on the end of the rod 63.

Figure 12:
Figure 11:

Referring now to Figs. 9, 10, 11 and 12 which illustrate one convenient means for stopping the supply of yarn to the wrap reel when a sufficient number of strands have been wound thereon, I mount upon the wrap reel shaft a spur wheel 66 working into a wheel 67 mounted on the frame of the machine. To the face of this wheel is secured a cam 68 with which works a pin 69 on a lever 70 pivoted at 71 and carrying at one end a weight 71$^a$ and at the other end a foot shaped piece 72. Loosely mounted in the frame work of the machine is a rod or bar 73 provided at one end with a collar 74 against which bears a spring 75, and at the other end with a handle piece 76. On the bar 73 are loose collars 77 and disks 78 of steel, glass or other suitable material. The yarn to be tested passes from the cops $d'$ through eyes or pigtails 79 and then between the disks 78 which are made in two parts capable of movement relatively to one another. Upon the bar 73 is also firmly secured a collar 81. When yarn is being wound off the cops, the handle 76 is pulled to the right against the action of the spring 75 and turned so that its end engages with the recessed portion 82 of a projecting bar 83; the loose collars 77 and disks 78 can now move so as to allow the yarn to pass freely between the disks. When a sufficient number of strands have been wound on the wrap reel, the cam 68 will have so moved as to hold the pin 69 in its highest position and a further slight movement imparted to the cam allows the pin 69 to fall; the end 72 of the lever 70 will now rise quickly and kick the handle 76 free from the catch bar 83. The spring 75 acting on the collar 81 will cause the two parts of each of the disks 78 to move tightly against one another and so grip the yarn passing between them. Any further rotation of the wrap reel will cause the yarn to break but cannot draw more from the cops. The cams shown in Figs. 11 and 12 are used in place of the cam 68, when half or quarter leas respectively are being tested.

I do not limit the application of my invention to the particular form of recording mechanism hereinbefore described and illustrated but I may modify this to suit any particular requirements.

Having now described my invention, what I claim as new and desire to secure by Letters Patent is;—

1. In a yarn testing machine, the combination with a lea tester of a flat wrap reel whereon the yarn is wound and supported preparatory to testing, substantially as set forth.

2. In a yarn testing machine, the combination with a lea tester of a rotatable wrap reel for the support of the yarn preparatory to testing and means for steadying or preventing rotation of the reel during the testing operation, substantially as set forth.

3. In a yarn testing machine, the combination with a lea tester of a rotatable flat wrap reel for the support of the yarn preparatory to testing and means for guiding the yarn during the winding of the same on to the reel, substantially as set forth.

4. In a yarn testing machine, the combination with a lea tester of a rotatable flat wrap reel for the support of the yarn preparatory to testing, and means for automatically stopping the supply of yarn when a sufficient number of strands have been wound on the said reel, substantially as set forth.

5. In a yarn testing machine, the combination consisting of a wrap reel whereon the yarn is wound and supported preparatory to testing, means whereby the yarn is subjected to tension without removal of the same from the said reel, and means for recording the amount of the said tension, substantially as set forth.

6. In a yarn testing machine, the combination consisting of a wrap reel whereon the yarn is wound and supported preparatory to testing, means whereby the yarn is subjected to tension without removal of the same from the said reel, and means for recording the amount of the said tension and of the stretch of the yarn produced thereby, substantially as set forth.

7. In a yarn testing machine, the combination consisting of a wrap reel whereon the yarn is wound and supported preparatory to testing, means whereby the yarn is subjected to tension without removal of the same from the said reel, and means for arresting the motion of the machine after breakage of the yarn, substantially as set forth.

In testimony whereof I affix my signature in presence of two witnesses.

JOHN MOSCROP.

Witnesses:
    VIVIAN ARTHUR HUGHES,
    CHARLES CONRAD.